US008422681B2

(12) United States Patent
Gennaro et al.

(10) Patent No.: US 8,422,681 B2
(45) Date of Patent: Apr. 16, 2013

(54) NON-INTERACTIVE HIERARCHICAL IDENTITY-BASED KEY-AGREEMENT

(75) Inventors: Rosario Gennaro, New York, NY (US); Shai Halevi, New York, NY (US); Hugo M Krawczyk, Tarrytown, NY (US); Tal Rabin, Riverdale, NY (US)

(73) Assignee: International Business Machines Corporation, Armonk, NY (US)

( * ) Notice: Subject to any disclaimer, the term of this patent is extended or adjusted under 35 U.S.C. 154(b) by 1195 days.

(21) Appl. No.: 12/043,755

(22) Filed: Mar. 6, 2008

(65) Prior Publication Data

US 2009/0225986 A1 Sep. 10, 2009

(51) Int. Cl.
*H04L 29/06* (2006.01)

(52) U.S. Cl.
USPC ......................................................... 380/277

(58) Field of Classification Search .......... 380/277–279, 380/44–47
See application file for complete search history.

(56) References Cited

U.S. PATENT DOCUMENTS

| 7,043,024 | B1 * | 5/2006 | Dinsmore et al. | 380/278 |
| 2002/0044657 | A1 * | 4/2002 | Asano et al. | 380/201 |
| 2002/0108036 | A1 * | 8/2002 | Okaue | 713/168 |
| 2003/0076958 | A1 * | 4/2003 | Ishiguro et al. | 380/277 |

OTHER PUBLICATIONS

W. Diffie, M.E. Hellman, New Directions in Cryptography, IEEE Transactions on Information Theory, 22 (6):644-654 (1976).
R. Sakai, K. Ohgishi, M. Kasahara, Cryptosystems Based on Pairings, Proceedings of SCIS 2000. (2000).
Carlo Blundo, Alfredo De Santis, Amir Herzberg, Shay Kutten, Ugo Vaccaro, Moti Yung, Perfectly Secure Key Distribution for Dynamic Conferences, Information and Computation, 146(1):1-23 (1998).
Eschenauer and Gligor, A Key-management scheme for distributed sensor networks, Proceedings of the 9th ACM Conference on Computer and Communications Security, ACM-CCS'02, pp. 41-47, ACM, 2002.
R. Dupont, A. Enge, Practical Non-Interactive Key Distribution Based on Pairings, http://eprint.iacr.org/2002/136 (2002).
Rolf Blom, An Optimal Class of Symmetric Key Generation Systems, EUROCRYPT '84, pp. 335-338, 1984.
B. Matt, Toward Hierarachical Identity-Based Cryptography for Tactical Networks, In Military Comminucations Conference, MJLCOM 2004, pp. 727-735, IEEE, 2004.

(Continued)

*Primary Examiner* — Kambiz Zand
*Assistant Examiner* — John B King
(74) *Attorney, Agent, or Firm* — August Law, LLC; George Willinghan

(57) ABSTRACT

A pairwise key-agreement scheme is provided for creating key agreements non-interactively between pairs of nodes disposed in a hierarchy of nodes. The scheme is non-interactive so that any two nodes can agree on a shared secret key without interaction. In addition, the scheme is identity-based so that any given node only needs to know the identity of peer nodes to compute the shared secret key. All of the nodes are arranged in a hierarchy where an intermediate node in the hierarchy can derive the secret keys for each of its children from its own secret key and the identity of the child. Accordingly, the scheme is fully resilient against compromise of any number of leaves in the hierarchy and of a threshold number of nodes in the upper levels of the hierarchy. The scheme is well-suited for environments such as mobile ad-hoc networks (MANETs), which are very dynamic, have acute bandwidth-constraints and have many nodes are vulnerable to compromise.

20 Claims, 1 Drawing Sheet

OTHER PUBLICATIONS

G. Hanaoka, T. Nishioka, Y. Zheng, H. Imai, A Hierarchical Non-interactive Key-Sharing Scheme with Low Memory Size and High Resistance against Collusion Attacks, Comput. J., 45(3):293-303, 2002.

D. Boneh, M. Franklin, Identity-Based Encryption from the Weil Pairing, Siam. J. Computing, 32(3):586-615, 2003.

T. Horwitz, B. Lynn, Towards Hierarchical Identity-Based Encryption, In Eurocrypt '02, pp. 466-481, 2002. LNCS No. 2332.

* cited by examiner

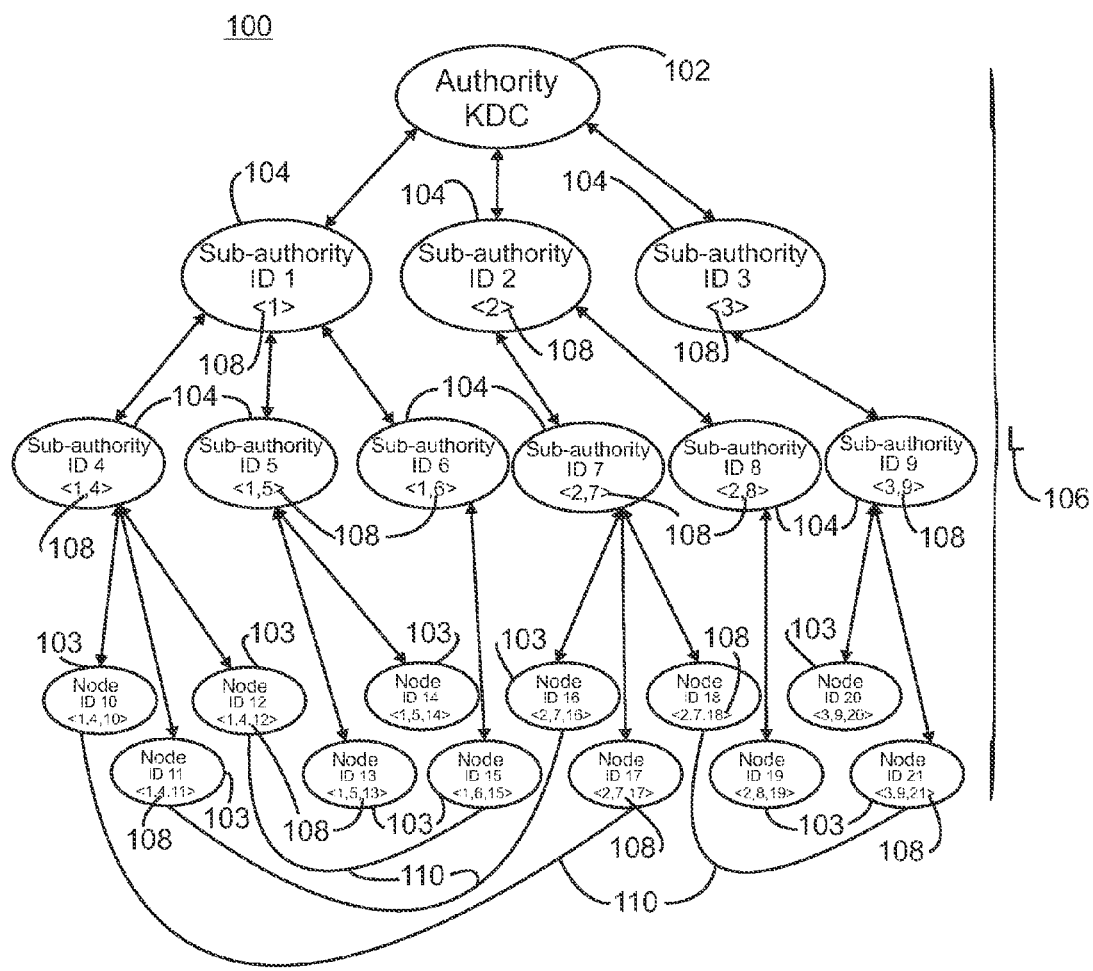

NON-INTERACTIVE HIERARCHICAL IDENTITY-BASED KEY-AGREEMENT

STATEMENT REGARDING FEDERALLY SPONSORED RESEARCH

The invention disclosed herein was made with U.S. Government support under Contract No. W911NF-06-3-0001 the U.S. Army. The Government has certain rights in this invention.

FIELD OF THE INVENTION

The present invention relates to secure communications.

BACKGROUND OF THE INVENTION

Key agreement is a fundamental tool for secure communication. A key agreement scheme lets two nodes in a network agree on a shared key that is known only to them, thus allowing them to use that key for secure communication. In environments where bandwidth is at a premium, there is a significant advantage to non-interactive schemes, where two nodes can compute their shared key without any interaction. The classical Diffie-Hellman key-exchange protocol, which is described in W. Diffie and M. E. Hellman, *New Directions in Cryptography*, IEEE Transactions on Information Theory, 22(6):644-654 (1976), is an example of such a non-interactive scheme. In the Diffie-Hellman key-exchange protocol, node A can compute a shared key with node B knowing only the public key of B and its own secret or private key. But each node in this protocol must still learn the public key of the other node, implying either direct communication between the nodes or some other form of coordination.

To minimize the required coordination between nodes, an identity-based key-exchange is used where the public key of a node is the name of that node. These schemes rely on a key distribution center (KDC), which is a central authority with a master secret key, to provide each node with a secret key that corresponds to the name of that node. An example of this scheme is described in R. Sakai, K. Ohgishi, and M. Kasahara, *Cryptosystems Based on Pairings*, Proceedings of SCIS 2000 (2000), where node A computes a shared key with node B knowing only the name of its own secret key.

Registering all nodes with just one central authority, however, is not always practical or possible. For example, in mobile ad-hoc networks (MANETs), frequent communications occur between nodes from different organizational units. In environments such as MANETs, a hierarchical system is preferred, where the central authority only needs to distribute keys to a small number of large organizations. Each of these large organizations can further distribute keys to smaller and smaller units until individual nodes obtain secret keys from their immediate unit. Such a hierarchical scheme would serve well also for tactical network applications where the organization of the network is already hierarchical in nature. Preferred schemes would be non-interactive, identity-based and hierarchical and would hold together with a strong security guarantee.

A previous attempt to provide a suitable scheme was proposed in Carlo Blundo, Alfredo De Santis, Amir Herzberg, Shay Kutten, Ugo Vaccaro, and Moti Yung, *Perfectly Secure Key Distribution for Dynamic Conferences*, Information and Computation, 146(1):1-23 (1998). According to the proposed scheme, each node has a secret polynomial that provides the role of a secret key. The shared key between two leaf nodes is computed by evaluating the polynomial of one node at a point that corresponds to the identity of the other. The main drawback of this proposed scheme is that security is ensured only as long as not too many nodes are compromised. Once the number of compromised nodes grows above some threshold, an attacker could learn keys of un-compromised nodes and perhaps the master secret key of the whole system. This threshold is essentially the degree of the polynomials that are used in that scheme. This vulnerability is particularly acute in MANETs, where the ad-hoc nature of the network makes it very hard to assure the integrity of nodes. In MANETs, therefore, a high enough threshold to ensure security in a realistic setting may not be possible.

SUMMARY OF THE INVENTION

Systems and methods in accordance with the present invention provide a hierarchical scheme for key distribution and communication that is fully resilient against compromise of any number of nodes in the lowest level or terminal nodes of the hierarchy. For tree structure hierarchies, these lowest level nodes are leaf nodes. In the upper levels of the hierarchy, i.e., above the leaf nodes, the scheme is resilient to the compromise of a threshold number of nodes. This combination of threshold resilience in the upper levels with full resilience in the leaves utilizes a trade-off in security. In general, upper-level nodes are often better protected, e.g., these nodes are less mobile and have better physical security among other factors, while leaf nodes are both more numerous and much more vulnerable to attack. In general, a degradation of security among the levels of the hierarchy is provided. Nodes that are lower in the hierarchy hold less secret information; therefore, corruption of these nodes is less threatening to the system as a whole.

Security analysis of exemplary embodiments of schemes in accordance with the present invention illustrates that for a hierarchical tree with a branching factor of l at each level and a security threshold set to t=l, a fully resilient scheme is obtained. A fully resilient scheme can tolerate any number of corrupted nodes, since the number of nodes at each level is less than the number of nodes that an adversary would need to break the system. In other words, when the security threshold is set to be equal to the tree branching factor, the amount of secret information is equivalent to sharing pairwise keys among all the nodes. Schemes in accordance with the present invention, however, are preferable to pairwise sharing since these schemes do not require advance knowledge of the identities of the nodes.

The secret information grows as $O(t^{2L})$; therefore, these schemes can be used for moderate values of t and small values of L. However, for many practical applications this limitation is not a concern. For example, consider a tactical application where the key distribution center (KDC) resides at the central headquarters. The leaf nodes belong to individual soldiers, and the intermediate nodes are the various units, for example down to the level of battalions. The number of levels is a relatively small number. In addition, the branching factor of this tree is also small, i.e., five or six, except for the lowest level. Therefore, the threshold is also going to be a small number. Placing the threshold at six, i.e., the branching factor, provides full resilience.

In accordance with one exemplary embodiment, the present invention is directed to a method for creating shared keys among a plurality of nodes arranged in a hierarchy. The hierarchy can have a given depth. A hierarchical key distribution scheme is used to compute shared keys between intermediate nodes in the hierarchy. In one embodiment, the hierarchical key distribution scheme is a linear hierarchical key distribution scheme. In one embodiment, a tree hierarchy is established among the plurality of nodes, the terminal nodes corresponding to the leaf nodes in the tree hierarchy. These intermediate nodes are located in the hierarchy between a root node in the hierarchy and terminal nodes. Each intermediate node uses only linear operations to compute a shared key. In a hierarchy of given depth, the terminal nodes are located at a level in the in the hierarchy corresponding to the given depth of the hierarchy. In addition, a non-interactive identity-based scheme is used to compute shared keys between terminal nodes in the hierarchy.

In one embodiment, use of the hierarchical key distribution scheme includes identifying a linear space containing a plurality of members wherein the sum of any two members of the linear space is contained within the linear space and a scalar multiple of any member of the linear space is contained within the linear space. A plurality of random elements is identified from the linear space such that the plurality of random elements constitutes master secret keys. A secret key is identified at any intermediate node as a set of values wherein each value in the set of values is a linear combination of the master secret keys. These linear combinations of the mast secret keys are used as shared keys for communications between any two intermediate nodes. In one embodiment, the number of values to be included in each intermediate node secret key is determined deterministically from public information, and all coefficients in any liner combination of the master secret keys are derived deterministically from public information.

In one embodiment, the hierarchical key distribution scheme is a polynomial-based linear hierarchical key distribution scheme is a polynomial-based scheme. In this scheme, a polynomial to be used as a master secret key is identified. The polynomial is based on a given depth of the hierarchy and a security threshold parameter expressing a maximum number of nodes that can be corrupted before all nodes in the hierarchy are compromised. The identified polynomial is used to compute a secret key for any intermediate node. In one embodiment, using the hierarchical key distribution scheme includes establishing a shared key from communication between two intermediate nodes by evaluating the polynomial at one of the intermediate node using values corresponding to the other intermediate node. In one embodiment, a key distribution center disposed at the root node in the hierarchy is used to identify the polynomial.

In one embodiment, the hierarchical key distribution scheme is a subset-based scheme. In the subset-based scheme, a plurality of random elements is identified from a linear space, the plurality of random elements constituting master secret keys. A set of values from the master secret keys is assigned to each intermediate node. Each set of values assigned to a given intermediate node includes a subset of secret key values associated with a parent node of that intermediate node. A shared key between any two intermediate nodes is identified using an intersection of the assigned sets of values for the two intermediate nodes. In one embodiment, a central authority disposed at the root node is used to identify the plurality of random elements. When using the central authority to identify a pre-determined plurality of numbers, each number has a value between 0 and 1, and the central authority is used to identify a cryptographic hash function. In one embodiment, the subset of parent node secret key values is computed deterministically using an identity of that intermediate node.

In one embodiment, use of the non-interactive identity-based scheme includes acquiring shared keys between any two terminal nodes without requiring communication between the two terminal nodes. In addition, for each terminal node, a common shared key between parent nodes of the two terminal nodes is used in combination with an identification of the other terminal node to calculate the shared key.

In one embodiment, a first cyclic group is identified, and a hash function that converts terminal node identity vectors to integer values contained within the first cyclic group is also identified. An integer valued secret key is identified, and a secret key for each terminal node that is a member of the first cyclic group is calculated using the identity vector of a given terminal node and the integer valued secret key in the identified hash function. In addition, a second cyclic group is identified, and a bilinear mapping from the first cyclic group to the second cyclic group is identified. The bilinear mapping is used on the secret key for a first terminal node and a hash function value generated by applying the identified hash function to a second terminal node identification vector to generate a shared key for communication between the first and second terminal nodes. The generated shared key a member of the second cyclic group.

BRIEF DESCRIPTION OF THE DRAWINGS

FIG. 1 is a schematic representation of an embodiment of a hierarchy for use with the hierarchical scheme for key distribution and communication of the present invention.

DETAILED DESCRIPTION

Exemplary embodiments of systems and methods in accordance with the present invention utilize a linear hierarchical key distribution system in combination with an identity-based key exchange protocol. Referring to FIG. 1, a plurality of nodes is arranged in a hierarchy 100. Suitable hierarchies include, but are not limited to, tree structure hierarchies. The hierarchy of nodes includes a root node 102, which acts as the key distribution center (KDC), lowest level or terminal nodes 103, i.e. leaf nodes in a tree structure, and a plurality of intermediate nodes 104 located between the root node and the leaf nodes. As illustrated, the hierarchy has a depth including the root node of 4; however, the hierarchy can be arranged with any suitable depth 106, which is designated generally as L. In a linear hierarchical key distribution system utilizing a hierarchy with a depth L, the nodes within that system are arranged in a tree with L levels. The leaf nodes are located at the level L. The identity of a given node corresponds to the path from the root node in the tree to that node. This path can be represented by a vector 108 that lists the branch or fork that is taken at every node in the hierarchy to reach a specific intermediate node or leaf node. For example, the identity of a node at level i is a vector with components $\langle I_1, \ldots, I_i \rangle$, where each $I_j$ is an integer between 1 and the branching factor of the tree, i.e., the number of route choices at any given node in the hierarchy.

A linear hierarchical key distribution scheme is defined over a linear space V, that is a set over which two operations are defined, addition (take two elements v and u in V and the value v+u is also in V), and scalar multiplication (given an integer a and an element v in V the value av is also in V). Given a sets of elements $v_1, v_2, \ldots v_m$ in V, an element v is called a linear combination of those elements if there exists integers $a_1, a_2, \ldots a_m$ (called coefficients) such that $v = a_1 v_1 + a_2 v_2 + \ldots + a_m v_m$ In a linear hierarchical key distribution scheme the following properties are satisfied. First, the central authority selects N random elements from V, to be used as the master secret keys. Second, the secret key of each node in the hierarchy includes a set of values $v_1, v_2, \ldots v_m$ in V, each of which is a linear combination of the master secret keys. Third, the shared key between every two nodes is an element of V, which is also a linear combination over V of the master secret keys. Fourth, the number of values in each node's secret key and all the coefficients in the linear combinations mentioned above are derived deterministically from public information. This public information includes the position of a node in the hierarchy and the identity of this node. In a hierarchical scheme, an internal node will provide its children with values that are a linear combination of its own values, which are be linear combinations of the master secret keys.

An example of a linear hierarchical key distribution scheme is a polynomial-based scheme. In the polynomial-based scheme, shared keys for communication 110 between nodes, including leaf nodes and intermediate nodes, in the hierarchy are determined using a pre-defined polynomial that is used for all of the nodes and is based on the depth of the hierarchy and the security threshold, called the threshold parameter. The security threshold expresses the maximum number of nodes that can be corrupted before the entire system of nodes is said to be compromised. For a desired threshold parameter t, the KDC identifies a random polynomial over $Z_q$ for a large enough prime q that is represented by $F(x_1, y_1, \ldots, x_L, y_L)$. The selected polynomial has a degree t in each variable such that $F(x_1, y_1, \ldots, x_L, y_L) \equiv F(y_1 x_1, \ldots, y_L, x_L)$, i.e., such that the polynomial is symmetric between the x's and y's. One way to choose such a polynomial is to choose a random polynomial f on the same variables and then to set $F(x_1, y_1, \ldots, x_L, y_L) = f(x_1, y_1, \ldots, x_L, y_L) + f(y_1, x_1, \ldots, y_L, x_L)$. The size of the description of F is $(t+1)^{2L}$. Therefore, this scheme is used with moderate values of t and small values of L.

The master secret key of the polynomial-based key distribution system is the identified polynomial F. This master secret key is used to determine the secret key of any node within the system and, therefore, the secret key to be used in communications between any two nodes within the system. For example, the secret key of a node with the identity I in the first level of the hierarchy is the polynomial $F_I = F(I, y_1, x_2, y_2, \ldots)$. This polynomial has 2L−1 variables. Similarly, the secret key of a node at level i with identity $\vec{I} = \langle I_1, \ldots, I_i \rangle$ is the polynomial $F_{\vec{I}} = F(I_1, y_1, \ldots, I_i, y_i, x_{i+1}, y_{i+1}, \ldots)$ that has 2L−i variables, and the secret key of the leaf with identity $\langle I_1, \ldots, I_L \rangle$ is the polynomial in L variables $F(I_1, y_1, \ldots, I_L, y_L)$.

Using this polynomial-based scheme, the shared key between two nodes disposed at the lowest level in the hierarchy, i.e., the two leaf nodes $\langle I_1, \ldots, I_L \rangle$ and $\langle J_1, \ldots, J_L \rangle$ is the value of the polynomial $F(I_1, J_1, \ldots, I_L, J_L) = F(J_1, I_1, \ldots, J_L, I_L)$. Each node computes the shared key by evaluating its own secret polynomial on the points that correspond to the identity of the peer node with which a given node wants to communicate. As long as the number of compromised nodes in each level is not too big, this scheme provides information-theoretic security for the keys. For example, let $C_i$ be the number of compromised nodes in level i of the tree. As long as $$\sum_{i=1}^{L} C_i / (t+1)^i < 1$$

is satisfied, an attacker has no information about the keys that are shared between any two non-compromised nodes.

Another example of a linear hierarchical key distribution scheme is the subset-based scheme that was first described in Eschenauer and Gligor, *A key-management scheme for distributed sensor networks*, Proceedings of the 9th ACM conference on Computer and Communications Security, ACM-CCS'02, pages 41-47, ACM, 2002. Generally in this scheme, the central authority selects N random elements from V, to be used as the master secret keys. The secret key of each node in the hierarchy includes values $v_1, v_2, \ldots v_m$ in V, which are a subset of the secret keys held by its parent. This subset is computed deterministically by the parent using the identity of the node. The shared key between every two nodes is the intersection of the set of values held by those two nodes.

More specifically, in a subset-based key distribution scheme the central authority chooses N random integers $v_1, v_2, \ldots v$ modulo a large prime q. Each node in the hierarchy holds a subset of $v_1, v_2, \ldots v_N$ as its secret key. The authority also chooses L parameters $p_1, \ldots, p_L$ where each $p_j$ is a number between 0 and 1, and a cryptographic hash function H. The parameters L, H and $p_1, \ldots, p_L$ are known to everyone.

Let $\langle I_1, \ldots, I_i \rangle$ be an internal node at level i in the hierarchy and $\langle I_1, \ldots, I_i, I_{i+1} \rangle$ be one of its children. Let $R = \{K_1, \ldots K_n\}$ be the secret keys held by node $\langle I_1, \ldots, I_i \rangle$. The parent node computes $r_j = H(I_1, \ldots, I_i, I_{i+1}, j)$ for each $j = 1 \ldots n$. If $r_j < p_j$ then the child node receives $K_j$.

Two leaf nodes $\langle I_1, \ldots, I_L \rangle$ and $\langle J_1, \ldots, J_L \rangle$ can repeat the entire process above to identify the intersection of their secret keys sets. Their shared key is computed as the sum modulo q of all the keys in the intersection.

It is possible to show that if one wants to tolerate the corruption of at most $t_i$ nodes at each level, then the optimal choice for the parameter $p_i$ is $1/(t_i+1)$. Also by choosing N large enough we can make the probability that the attacker finds the shared key of any non-corrupted nodes negligible. If $N = c \ e^L \pi_i t_i (t_i+1)$ for a constant c, then the probability that an adversary that corrupts at most $t_i$ nodes at level i of the hierarchy will learn the shared key of any pair of uncorrupted nodes with probability at most $e^{-c}$.

Regarding bilinear maps and the bilinear decisional Diffie-Hellman (BDDH) problem, let $G_1$ and $G_2$ be two cyclic groups of order q for some large prime q. In addition, let e be a mapping e: $G_1 \times G_1 \rightarrow G_2$. The mapping e is:
 1. Bilinear if $e(P^a, Q^b) = e(P,Q)^{ab}$ for any P, $Q \in G_1$, a, $b \in Z_q$.
 2. Non-degenerate if e does not send all pairs to the identity in $G_2$
 3. Computable if there is an efficient algorithm to compute e(P,Q) for all P,$Q \in G_1$.

Letting $G_1, G_2$ and e be as described above, the BDDH problem, which is described in D. Boneh and M. Franklin, *Identity-Based Encryption from the Weil Pairing*, SIAM. J. Computing, 32(3):586-615 (2003), is as follows. Given a random $P \in G_1$, $P^a$, $P^b$, $P^c \in G_1$ for random a, b, $c \in Z_q$, and given $h \in G_2$, it is hard to distinguish the case where $h = e(P,P)^{abc}$ from the case where $h = e(P,P)^r$ for a random and independent $r \in Z_q$.

An algorithm A has advantage $\epsilon$ solving the BDDH in($G_1$, $G_2$, e) if $$Pr[A(P,P^a,P^b,P^c,e(P,P)^{abc})=1] - Pr[A(P,P^a,P^b,P^c,e(P,P)^r)=1] \geq \epsilon$$

where the probability is over the random choice of $P \in G_1$, a, b, c, $r \in Z_q$, and the internal randomness of A. The BDDH assumption (with respect to $\langle G_1, G_2, e \rangle$) states that feasible adversaries can have only an insignificant advantage.

Given this, the non-interactive identity-based key agreement scheme, which was not hierarchical, was proposed in R. Sakai, K. Ohgishi, and M. Kasahara, *Cryptosystems Based on Pairings*, Proceedings of SCIS 2000 (2000). In this identity-based agreement scheme, a KDC sets up the parameters for an identity-based public key system by fixing two cyclic groups $G_1$, $G_2$ such that the first group maps to the second group through the bilinear map e: $G_1 \times G_1 \rightarrow G_2$. In addition, the identity-based scheme chooses a cryptographic hash function H: $\{0,1\}^* \rightarrow G_1$. Therefore, the hash function converts identities to a value contained within the first cyclic group. An integer-valued secret key $s \in Z_q$ is chosen. A given node having the identity ID is provided with the secret key $S_{ID} = H(ID)^s \in G_1$, since an integer multiple of a value from the cyclic group will also be contained within the cyclic group.

In addition to calculating a secret key for each node, shared keys for communication between two nodes are required such that communication between the nodes is not required in order to exchange the shared keys. The shared key between two nodes with identities $ID_1$ and $ID_2$ is $K = e(H(ID_1), H(JD_2))^s \in G_2$. Therefore, the shared keys are contained in the second cyclic group to which the first cyclic group can be mapped by definition. The individual nodes can compute the appropriate shared key independently by setting $K = e(S_{ID_1}, H(ID_2))$ or $K = e(H(ID_1), S_{ID_2})$ i.e., knowing its own secret key and the hash function value at the identity of the other node and performing the appropriate mapping to the second cyclic group. The security of this scheme can be reduced to the BDDH assumption in the random-oracle model, as was shown in R. Dupont and A. Enge, *Practical Non-Interactive Key Distribution Based on Pairings*, http://eprint.iacr.org/2002/136 (2002).

Exemplary embodiments of systems and methods in accordance with the present invention utilize a combination of the linear hierarchical scheme with the non-interactive identity-based scheme. In accordance with exemplary embodiments of the present invention, a hierarchical identity-based key agreement scheme is provided that is secure against any number of corruptions in the lowest level of the hierarchy. A key distribution center (KDC) 102 and a hierarchy of authorities, e.g., intermediate nodes 104, are provided that issue keys to nodes lower in the hierarchy. Any two leaves 103 within the hierarchy can establish a shared key for communication 110 non-interactively. In general, systems and methods in accordance with the present invention utilize a combination of a hierarchy and threshold scheme with a scheme that provides full resilience for leaf nodes. In the linear hierarchical scheme each node uses only linear operations to compute the shared key with another node. Let s be such shared key. Therefore a leaf node with identity ID can perform this linear computation "in the exponent", thereby obtaining the secret $H(ID)^s$ as needed for the leaf node full resiliency scheme, i.e., the identity-based scheme described above.

In one embodiment, a KDC is utilized that knows the arrangement or topology of the nodes within the hierarchy including the depth of that hierarchy (denoted L) and the desired threshold (denoted t). The KDC sets up the parameters for an identity-based public key system by fixing two cyclic groups $G_1$, $G_2$ of order q and the bilinear map e: $G_1 \times G_1 \rightarrow G_2$ between these two groups. The KDC identifies two hash functions $\hat{H}$: $\{0,1\}^* \rightarrow Z_q$ and H: $\{0,1\}^* \rightarrow G_1$. In addition, a master secret key polynomial F is established for an L-level hierarchy with threshold t as described above for the polynomial-based key distribution system.

The system utilizes two different schemes to calculate shared keys. One scheme is used for all intermediate nodes 104, i.e., all nodes between the root node (KDC) 102 and the lowest level or leaf nodes 103. A separate scheme is used to calculate shared keys for the leaf nodes 103. In one embodiment, secret keys and shared keys for the intermediate nodes 104 are calculated using the polynomial-based scheme. The secret keys and shared keys of the leaf nodes 103 are calculated using a modification of the non-interactive identity-based key agreement scheme.

In one embodiment, the secret keys of all the intermediate nodes (up to level L) are derived using the polynomial-based scheme described above. An intermediate node is a node between the root node or KDC and any leaf node. Every node, including leaf nodes and intermediate node, has an associated location identification vector 108 that describes the path through the hierarchy to a given node. The intermediate node identification vector contains a plurality of values, and each value is the root or branch that is taken at a given node or level of the hierarchy to reach the given node. In one embodiment, $$\vec{ID}|_i = \langle ID_1, \ldots, ID_i \rangle$$

is the identity or identification location vector of a node at level $i \leq L$ of the hierarchy. The identified hash function that produces values that are a member of the identified first cyclic group takes the location identification vector as an input and produces an integer valued location identifier. An integer identifier is produced for every node in the path to the given node. Therefore, for every $j \leq i$, the integer $I_j = \hat{H}(ID_1, \ldots, ID_j) \in Z_q$ is computed. These integer values are used in the identified polynomial to produce the secret key for any intermediate node in the hierarchy. Thus, the secret key of $\vec{ID}|_i$ includes all the coefficients of the polynomial with $2L-i$ variables $$F_{ID|_i}(x_{i+1}, \ldots, x_L, y_1, \ldots, y_L) \underline{\underline{\text{def}}} F(I_1, y_1, \ldots, I_i, y_i, x_{i+1}, y_{i+1}, \ldots, x_L, y_L)$$

These secret keys and the polynomials are used to compute shared keys for communication between intermediate nodes in the hierarchy. The shared keys between intermediate nodes, and in particular between intermediate nodes that are parent nodes of the lowest level or leaf nodes, are also used in the non-interactive calculation of shared keys between leaf nodes.

In one embodiment, the secret key between any pair of two leaf nodes, for example a first and second leaf node, are computed as follows. Let $\vec{ID} = \langle ID_1, \ldots, ID_j \rangle$ be a node at level L, and let $\langle \alpha_1, \alpha_2, \ldots \rangle$ be all the coefficients of the polynomial $F_{\vec{ID}}$ (in canonical order). Consider a first leaf node under the intermediate node $\vec{ID}$ that has identity $(\vec{ID}, ID_{L+1})$. This intermediate node is the parent node of the first leaf node. An integer valued location identification is calculated using an identification vector for the first leaf node, $I_{L+1} = H(\vec{ID}, ID_{L+1}) \in G_1$. This integer value is raised to the power of each coefficient from the polynomial of the parent node, and the secret key of the leaf node is set to $\langle (I_{L+1})^{\alpha_1}, (I_{L+1})^{\alpha_2}, \ldots \rangle$ (in the same canonical order). Namely, for any coefficient $\alpha$ that intermediate node $\vec{ID}$ has in its secret key, it gives to the child the value $(I_{L+1})^\alpha$.

Therefore, given all the values $(I_{L+1})^\alpha$, a leaf node can compute $(I_{L+1})^{F_{\vec{ID}}(\vec{J})}$ for any $\vec{J} = \langle J_1 \ldots J_L \rangle$. For example, if it knows the value $(I_{L+1})^\alpha$ for the coefficient $\alpha$ that corresponds to the term $\alpha y_1 y_2^2$, then it can evaluate $((I_{L+1})^\alpha)^{J_1 J_2^2} = (I_{L+1})^{\alpha J_1 J_2^2}$. Similarly it can compute the values that correspond to all the other monomials, and get $(I_{L+1})^{F_{\vec{ID}}(\vec{J})}$ by multiplying them.

Consider now two leaf nodes, a first leaf node $ID_A$ under the intermediate node $\vec{ID} = \langle ID_1, \ldots, ID_L \rangle$ and a second leaf node $ID_B$ under the intermediate node $\vec{ID} = \langle ID'_1, \ldots, ID'_L \rangle$. The location identification vectors for the intermediate nodes are identified and used as inputs in the hash function to produce integer valued identifications for the intermediate nodes. These integer values are members of the first cyclic group. For example, $I_i = \tilde{H}(ID_1, \ldots, ID_i)$ and $J_i = \tilde{H}(ID'_1, \ldots, ID'_i)$ are the hash values that are obtained for the first and second intermediate nodes $\vec{ID}$ and $\vec{ID}'$. The resulting vectors are $\vec{I} = \langle I_1, \ldots, I_L \rangle$ and $\vec{J} = \langle J_1, \ldots, J_L \rangle$. Let $s(\vec{ID}, \vec{ID}')$ be the "Blundo secret key", i.e., the shared key, that is defined for the first and second intermediate nodes $\vec{ID}$ and $\vec{ID}'$. Therefore, $s(\vec{ID}, \vec{ID}') = F_{\vec{ID}}(\vec{J}) = F_{\vec{ID}'}(\vec{I})$. This common shared key can be used at each leaf node under the corresponding intermediate node to non-interactively and independently calculate a shared node for communication between the first and second leaf nodes. For example, the shared key between the first and second leaf nodes $(\vec{ID}, ID_A)$ and $(\vec{ID}', ID_B)$ is defined as $$k = e(I_{L+1}, J_{L+1})^{s(\vec{ID}, \vec{ID}')}, \text{ where } I_{L+1} = H(\vec{ID}, ID_A) \text{ and }$$
$$J_{L+1} = H(\vec{ID}', ID_B)$$

The first leaf node $(\vec{ID}, ID_A)$ can compute this value by computing $S = (I_{L+1})^{F_{\vec{ID}}(\vec{J})} = (I_{L+1})^{s(\vec{ID}, \vec{ID}')}$ and setting $K = e(S, J_{L+1})$, and similarly second leaf node $(\vec{ID}', ID_B)$ can independently compute this value by computing $S' = (J_{L+1})^{F_{\vec{ID}'}(\vec{I})} = (J_{L+1})^{s(\vec{ID}, \vec{ID}')}$ and then setting $K = e(I_{L+1}, S')$. Therefore, at any given leaf node, a combination of the location identification vector for the leaf node with which communication is desired and the shared key for communications between the parent nodes of the two leaf nodes is used to determine the shared key between the leaf nodes.

In another embodiment, the secret keys of all the intermediate nodes (up to level L, i.e., parents of leaf nodes, are derived using the subset-based scheme described above. Let $\langle I_1, \ldots, I_L \rangle$ be the parent of a leaf node and let $R = \{K_1, \ldots K_n\}$ be the secret keys it holds. Let $ID = H(I_1, \ldots, I_{L+1})$ be the hash of the identity of one of its leaf nodes, then this node receives the values $S_i = ID^{K_i}$ Let $\langle I_1, \ldots, I_{L+1} \rangle$ and $\langle J_1, \ldots, J_{L+1} \rangle$ be two leaves, with $ID = H(I_1, \ldots, I_{L+1})$ and $JD = H(J_1, \ldots, J_{L+1})$. Let IR be the intersection of the values held by their parents, i.e., $IR = \{K_1 \ldots K_n\}$ where both $\langle I_1, \ldots, I_L \rangle$ and $\langle J_1, \ldots, J_L \rangle$ know $K_j$. For each $K_j$ in IR, the leaf $\langle I_1, \ldots, I_{L+1} \rangle$ holds $S_j = ID^{K_j}$ and the leaf $\langle J_1, \ldots, J_{L+1} \rangle$ holds $T_j = JD^{K_j}$. Let K be the sum of all the $K_j$ in IR. Then the leaf $\langle I_1, \ldots, I_{L+1} \rangle$ holds $S = ID^K = \pi_j S_j = ID^{\Sigma K_j}$ and the leaf $\langle J_1, \ldots, J_{L+1} \rangle$ holds $T = JD^K = \pi_j S_j = JD^{\Sigma K_j}$. The shared key between these two leaves is $e(ID, JD)^K = e(S, JD) = e(ID, T)$.

Any attack against nodes arranged in hierarchies and provided with shared keys using schemes in accordance with the present invention (when using $\langle G_1, G_2, e \rangle$ translates to an attack that solves BDDH in the same groups with the same advantage. That is, there exists a reduction in the random oracle model from breaking the scheme to solving BDDH, which preserve the advantage and complexity of the attacker.

In both embodiments, the BDDH assumption could be replaced with the computational BDDH assumption, by replacing the key $e(I,J)^s$ by its hash $H'(e(I,J)^s)$ with $H'$ yet another random oracle. H only needs to ensure that the linear system has full rank.

Methods and systems in accordance with exemplary embodiments of the present invention can take the form of an entirely hardware embodiment, an entirely software embodiment or an embodiment containing both hardware and software elements. In a preferred embodiment, the invention is implemented in software, which includes but is not limited to firmware, resident software and microcode. In addition, exemplary methods and systems can take the form of a computer program product accessible from a computer-usable or computer-readable medium providing program code for use by or in connection with a computer, logical processing unit or any instruction execution system. For the purposes of this description, a computer-usable or computer-readable medium can be any apparatus that can contain, store, communicate, propagate, or transport the program for use by or in connection with the instruction execution system, apparatus, or device. Suitable computer-usable or computer readable mediums include, but are not limited to, electronic, magnetic, optical, electromagnetic, infrared, or semiconductor systems (or apparatuses or devices) or propagation mediums. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Suitable data processing systems for storing and/or executing program code include, but are not limited to, at least one processor coupled directly or indirectly to memory elements through a system bus. The memory elements include local memory employed during actual execution of the program code, bulk storage, and cache memories, which provide temporary storage of at least some program code in order to reduce the number of times code must be retrieved from bulk storage during execution. Input/output or I/O devices, including but not limited to keyboards, displays and pointing devices, can be coupled to the system either directly or through intervening I/O controllers. Exemplary embodiments of the methods and systems in accordance with the present invention also include network adapters coupled to the system to enable the data processing system to become coupled to other data processing systems or remote printers or storage devices through intervening private or public networks. Suitable currently available types of network adapters include, but are not limited to, modems, cable modems, DSL modems, Ethernet cards and combinations thereof.

In one embodiment, the present invention is directed to a machine-readable or computer-readable medium containing a machine-executable or computer-executable code that when read by a machine or computer causes the machine or computer to perform a method for creating shared keys among a plurality of nodes arranged in a hierarchy of given depth in accordance with exemplary embodiments of the present invention and to the computer-executable code itself. The machine-readable or computer-readable code can be any type of code or language capable of being read and executed by the machine or computer and can be expressed in any suitable language or syntax known and available in the art including machine languages, assembler languages, higher level languages, object oriented languages and scripting languages. The computer-executable code can be stored on any suitable storage medium or database, including databases disposed within, in communication with and accessible by computer networks utilized by systems in accordance with the present invention and can be executed on any suitable hardware platform as are known and available in the art including the control systems used to control the presentations of the present invention.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s) and steps or elements from methods in accordance with the present invention can be executed or performed in any suitable order. Therefore, it will be understood that the appended claims are intended to cover all such modifications and embodiments, which would come within the spirit and scope of the present invention.

What is claimed is:

1. A method for creating shared keys among a plurality of nodes arranged in a hierarchy, the method comprising:
   using a hierarchical and threshold key distribution scheme at intermediate nodes in a computing network to compute shared keys between all intermediate nodes in the hierarchy, the threshold comprising a maximum number of intermediate nodes that can be corrupted before the computing network is compromised, the intermediate nodes located in the hierarchy between a root node in the hierarchy and terminal nodes, each intermediate node using only linear operations to compute a shared key; and
   using a separate non-interactive identity-based scheme at terminal nodes in the computing network to compute shared keys only between terminal nodes in the hierarchy and to provide full resilience against any number of corruptions in the terminal nodes.

2. The method of claim 1, wherein the hierarchical key distribution scheme comprises a linear hierarchical and threshold key distribution scheme.

3. The method of claim 1, wherein the hierarchy comprises a given depth and the terminal nodes are located at a level in the in the hierarchy corresponding to the given depth of the hierarchy.

4. The method of claim 1, wherein the method further comprises establishing a tree hierarchy among the plurality of nodes, the terminal nodes corresponding to the leaf nodes in the tree hierarchy.

5. The method of claim 1, wherein the step of using the hierarchical and threshold key distribution scheme further comprises:
   identifying a linear space comprising a plurality of members, wherein the sum of any two members of the linear space is contained within the linear space and a scalar multiple of any member of the linear space is contained within the linear space;
   identifying a plurality of random elements from the linear space, the plurality of random elements comprising master secret keys;
   identifying a secret key at any intermediate node as a set of values wherein each value in the set of values comprises a linear combination of the master secret keys; and
   using linear combinations of the master secret keys as shared keys for communications between any two intermediate nodes.

6. The method of claim 5, further comprising determining the number of values to be included in each intermediate node secret key deterministically from public information and deriving all coefficients in any linear combination of the master secret keys deterministically from public information.

7. The method of claim 1, wherein the hierarchical and threshold key distribution scheme is a polynomial-based linear hierarchical key distribution scheme.

8. The method of claim 7, wherein the step of using the hierarchical and threshold key distribution scheme further comprises:
   identifying a polynomial to be used as a master secret key, the polynomial based on a given depth of the hierarchy and a security threshold parameter comprising the maximum number of nodes that can be corrupted before all nodes in the hierarchy are compromised; and
   using the identified polynomial to compute a secret key for any intermediate node.

9. The method of claim 8, wherein the step of using the hierarchical and threshold key distribution scheme further comprises establishing a shared key from communication between two intermediate nodes by evaluating the polynomial at one of the intermediate node using values corresponding to the other intermediate node.

10. The method of claim 8, wherein the step of identifying the polynomial further comprises using a key distribution center disposed at the root node in the hierarchy to identify the polynomial.

11. The method of claim 1, wherein the hierarchical and threshold key distribution scheme comprises a subset-based scheme.

12. The method of claim 11, wherein the step of using linear hierarchical and threshold key distribution scheme further comprises:
   identifying a plurality of random elements from a linear space, the plurality of random elements comprising master secret keys;
   assigning to each intermediate node a set values from the master secret keys, the set of values assigned to a given intermediate node comprising a subset of secret key values associated with a parent node of that intermediate node; and
   identifying a shared key between any two intermediate nodes using an intersection of the assigned sets of values for the two intermediate nodes.

13. The method of claim 12, wherein the step of identifying a plurality of random elements further comprise using a central authority disposed at the root node to identify the plurality of random elements.

14. The method of claim 13, further comprising using the central authority to identify a pre-determined plurality of numbers, each number comprising a value between 0 and 1, and to identify a cryptographic hash function.

15. The method of claim 12, further comprising computing the subset of parent node secret key values deterministically using an identity of that intermediate node.

16. The method of claim 1, wherein the step of using the non-interactive identity-based scheme further comprises acquiring shared keys between any two terminal nodes without requiring communication between the two terminal nodes.

17. The method of claim 16, wherein the step of using the non-interactive identity-based scheme further comprises, for each terminal node, using a common shared key between parent nodes of the two terminal nodes in combination with an identification of the other terminal node to calculate the shared key.

18. The method of claim 1, wherein the step of using the non-interactive identity-based scheme further comprises:
   identifying a first cyclic group;

identifying a hash function that converts terminal node identity vectors to integer values contained within the first cyclic group;

identifying an integer valued secret key; and calculating a secret key for each terminal node that is a member of the first cyclic group using the identity vector of a given terminal node and the integer valued secret key in the identified hash function.

19. The method of claim 18, wherein the step of using the non-interactive identity-based scheme further comprises:

identifying a second cyclic group;

identifying a bilinear mapping from the first cyclic group to the second cyclic group; and using the bilinear mapping on the secret key for a first terminal node and a hash function value generated by applying the identified hash function to a second terminal node identification vector to generate a shared key for communication between the first and second terminal nodes, the generated shared key a member of the second cyclic group.

20. A non-transient computer-readable medium containing a computer-readable code that when read by a computer causes the computer to perform a method for creating shared keys among a plurality of nodes arranged in a hierarchy, the method comprising:

using a hierarchical and threshold key distribution scheme at intermediate nodes in a computing network to compute shared keys between all intermediate nodes in the hierarchy, the threshold comprising a maximum number of intermediate nodes that can be corrupted before the computing network is compromised, the intermediate nodes located in the hierarchy between a root node in the hierarchy and terminal nodes, each intermediate node using only linear operations to compute a shared key; and using a separate non-interactive identity-based scheme at terminal nodes in the computing network to compute shared keys only between terminal nodes in the hierarchy and to provide full resilience against any number of corruptions in the terminal nodes.

* * * * *